United States Patent [19]

Miyagawa et al.

[11] Patent Number: 5,448,551
[45] Date of Patent: Sep. 5, 1995

[54] OPTICAL INFORMATION RECORDING MEDIA AND OPTICAL INFORMATION READ/WRITE DEVICE

[76] Inventors: Naoyasu Miyagawa, 17-21-202, Fujigaoka, Suita-shi, Osaka 564; Eiji Ohno, 1-4-15, Himurodai, Hirakata-shi, Osaka 573-01; Kenichi Nishiuchi, 2-29-15-508, Okubo-cho, Moriguchi-shi, Osaka 570, all of Japan

[21] Appl. No.: 249,381

[22] Filed: May 25, 1994

[30] Foreign Application Priority Data

May 26, 1993 [JP] Japan ................... 5-123924

[51] Int. Cl.$^6$ ............................... G11B 7/26
[52] U.S. Cl. ........................ 369/271; 369/273; 369/116
[58] Field of Search ............ 369/275.1, 275.3, 275.4, 369/275.2, 278, 279, 284, 116

[56] References Cited

U.S. PATENT DOCUMENTS

| | | | |
|---|---|---|---|
| 4,423,502 | 12/1983 | Dil | 369/275 |
| 4,949,331 | 8/1990 | Maeda et al. | 369/275.3 |
| 5,084,860 | 1/1992 | Maeda et al. | 369/275.3 |
| 5,109,373 | 4/1992 | Ohno et al. | 369/100 |
| 5,199,022 | 3/1993 | Suzuki et al. | 369/275.1 |
| 5,249,175 | 9/1993 | Akahira et al. | 369/275.3 |

FOREIGN PATENT DOCUMENTS

| | | |
|---|---|---|
| 63-066734 | 3/1988 | Japan . |
| 63-057859 | 11/1988 | Japan . |
| 3040247 | 2/1991 | Japan . |
| 5282705 | 10/1993 | Japan . |
| 2091028 | 1/1981 | United Kingdom . |

OTHER PUBLICATIONS

Mitsuro et al., Optical Recording And Reproducing Device, Mar. 24, 1982, Abstract of Laid Open Japanese Patent Publication No. 57-050330, corresponding to Japanese Patent No. 63-057859.

Kayanuma et al., High Track Density Magneto-Optical Recording Using A Crosstalk Canceler, SPIE vol. 1316 Optical Data Storage (1990), pp. 35-39.

Yamada et al., High Speed Overwritable Phase Change Optical Disk Material, Japanese Journal of Applied Physics, vol. 26 (1987) Supplement 26-4, pp. 61-66.

Jipson et al., Two-Dimensional Modeling Of An Optical Disk Readout, Applied Optics, vol. 22, No. 14, Jul. 15, 1983, pp. 2202-2209.

*Primary Examiner*—Georgia Y. Epps
*Assistant Examiner*—Tan Dinh
*Attorney, Agent, or Firm*—Willian Brinks Hofer Gilson & Lione

[57] ABSTRACT

Both guide grooves and lands of an optical information recording medium constitute information tracks, the depth of the guide groove being between approximately $\lambda/8$ and approximately $\lambda/4.7$ in optical length and the width of the guide groove being between 0.34R and R, where R represents the beam diameter of a write laser beam on the record film and the power for writing information on each guide groove being differentiated from that for writing information on each land.

28 Claims, 17 Drawing Sheets

OPTICAL INFORMATION RECORDING MEDIA AND OPTICAL INFORMATION READ/WRITE DEVICE

BACKGROUND 0f THE INVENTION

1. Field of the Invention

The invention relates to an optical information read/write device in use for recording information signals on an optical information recording medium having improved information density, where information is written on guide grooves as well as regions between two guide grooves adjacent with each other, all guide grooves of the optical recording medium being formed before writing information.

2. Description of the Prior Art

In recent years there have been extensive research and development on optical information recording media to achieve high density recording of such information as image and voice signals. One of the well-known examples is an optical disk. A writable optical disk has guide grooves formed in advance by cutting on a transparent substrate. Information signals are read or written by focusing a laser beam onto these tracks. When a commercially available optical disk is used for writing information signals, signals are normally written on either guide grooves or regions between two guide grooves adjacent with each other (hereinafter referred to as the land), but not on both.

When writing information signals, a laser beam from an optical head is focused by an object lens onto a recording layer in a guide groove. When the intensity of the laser beam is strong, the region the laser beam is focused on undergoes a change in reflectance, and a record mark is formed. The distance between record marks on adjacent guide grooves is the width of the land between them.

When reading information signals, record marks arranged along a guide groove are irradiated by a focused laser beam, which is either reflected or absorbed, thus the intensity of the reflected laser beam varies. Reading of information signals is performed by an optical head detecting the variation of the intensity of the reflected light. The track pitch, that is, the spatial period of guide grooves is about the size of the laser beam spot and set to be 1.6 μm in this explanation. The depth of the guide groove is about one eighth of the wavelength of the read beam in optical length. This depth gives rise to the maximum push-pull signals of reflected light from an optical disk having guide grooves, thus provides the most stable push-pull tracking control.

In order to increase memory capacity of an optical disk it would be natural to write information signals on both guide grooves and lands and increase information track density. In this method, however, the distance between two adjacent information tracks is approximately a half the laser beam spot. Therefore, the beam overlaps the information tracks next to the information track intended to read. Thus, the cross talk for reading becomes significant causing degradation of the read S/N ratio. A paper of SPIE Vol. 1316 Optical Data Storage (1990), pp. 35, "High track density magneto-optical recording using a cross talk canceller" describes a method to reduce the cross talk, in which an optical read apparatus comprises triple-beam optics and a cross talk cancellation circuit. A drawback, however, is that the optics and signal processing circuits become large and complex.

A U.S. Pat. No. 4,423,502 presents a technique to reduce cross talk between adjacent information tracks by using different effective levels for adjacent information tracks. When information is written on both guide grooves and lands, the difference between the effective levels means the depth of the guide grooves. According to the U.S. Patent, when the writing mechanism is to change the reflectivity of the medium, the desirable effective level difference is between $\lambda_e/8$ and $\lambda_e/4$ ($\lambda_3$ is the wavelength of the read laser beam at the recording medium). This method allows one to reduce the cross talk without using the cancellation circuits mentioned above.

This patent, however, mentions nothing about erasable media. We applied the method to an erasable optical disk and found the following problems. (1) When the width of the guide groove is narrower compared to the read beam spot, the beam erases part of marks on the adjacent tracks causing degradation of the read signals. (2) When the width of the guide groove is wider compared to the write beam spot, the write beam tends to wobble from the center line of the guide groove. It causes incomplete erase of old marks when writing in the over-write scheme, thus resulting again in degradation of the read signals. (3) If the thermal conductivities of medium materials are high, or the structure of the medium makes the thermal conductivity high, the heat generated in writing erases part of marks on the adjacent tracks giving rise to degradation of the read signals.

SUMMARY OF THE INVENTION

The object of the present invention is to present optical recording media and optical read/write devices which allow higher effective information density while suppressing degradation of read signals.

To achieve the aforementioned object the medium of the present invention is made to have a depth of the guide grooves between $\lambda/8$ and $\lambda/4.7$, where $\lambda$ is the wavelength of the read optical beam in optical length, and almost equal widths of the guide grooves and lands. The write laser beam has the beam diameter of R on the record layer, (R is the diameter where the intensity reduces to $1/e^2$ of the intensity of the center of the beam) and has the following relation, $$0.34 \leq W_g/R \leq 1.0,$$

where $W_g$ is the width of the guide grooves.

With this configuration the write beam irradiates the full widths of the guide groove and land. Consequently, the widths of the formed record marks are always narrower than $W_g$, and do not extend to the adjacent information tracks. Therefore, when writing, the beam erases old marks completely, but does not erase even part of marks on the adjacent information tracks, thus giving rise to no degradation of write signals.

Further a more desirable medium uses as a record film a material which undergoes a phase transition between an amorphous phase and a crystalline phase, and has an arrangement of a dielectric film, record film, another dielectric film, and reflection film, in this order, the record film being between 5 nm and 70 nm in thickness and the reflection film exceeding 10 nm. This arrangement suppresses the thermal diffusion within the record film and the thermal effect on the adjacent information tracks.

The optical information read/write device of the present invention comprises one of the aforementioned optical information recording media, an optical system irradiating an optical information recording medium with an optical beam emitted from a light source, optical beam control means for switching the intensity of the optical bee between the write power level and the erase power level according to write signal waveforms when writing information signals, first means for moving the optical beam along the direction normal to the track, second means for relatively moving the optical beam along the direction of the tracks, means for detecting the lateral deviations of the optical beam from the information track by measuring the reflected beam from or transmitted beam through the optical information recording medium and putting out signals associated with the deviation referred to as first signals, means for receiving the first signals, inverting the polarity of the first signals so that the polarity, when the optical beam is on guide grooves, is opposite to the polarity when the optical beam is on regions between two guide grooves adjacent with each other, and putting out the modified signals referred to as second error signals, and tracking control means for receiving the second error signals and controlling the optical beam moving means so that the optical beam correctly traces the information tracks.

When writing information signals, the optical beam control means switches the intensity of the optical beam between the write power level and the erase power level according to write signal waveforms. Therefore, this configuration allows one to write new record marks erasing old record marks simultaneously. Thus the optical information read/write device is able to write information signals on the optical information recording medium of the present invention in high quality and in high speed.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED INVENTION

The invention will be described in detail with reference to an erasable optical disk as an optical information medium.

Figure 1:
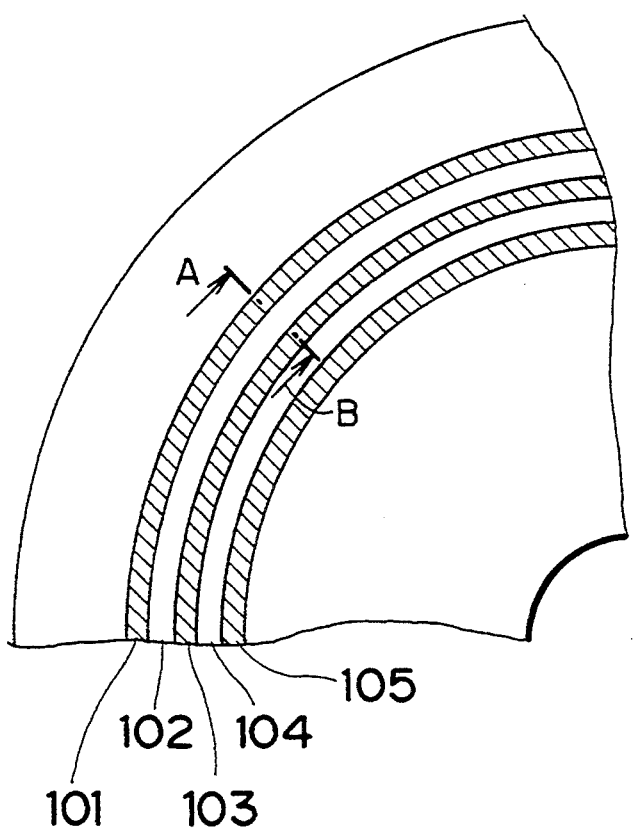
FIG. 1 shows a top view of a part of the optical disk used in the preferred embodiments of the present invention.
Figure 2:
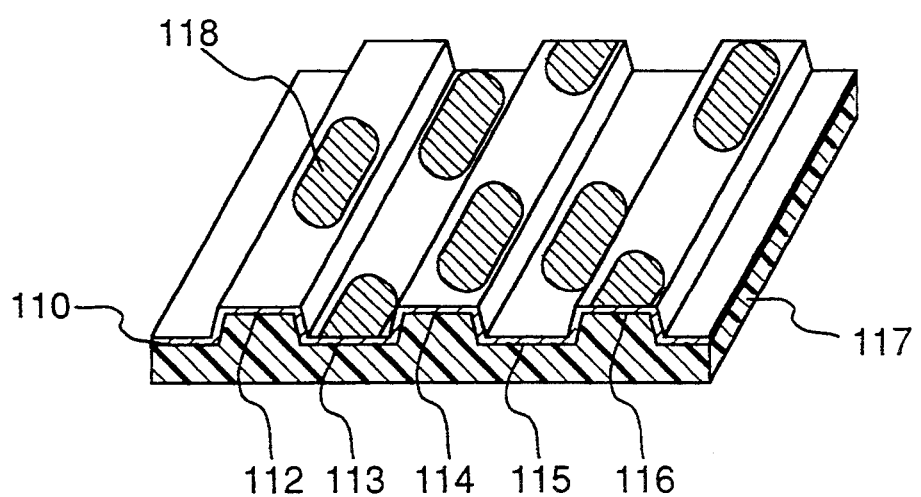
FIG. 2 illustrates a magnified perspective view of said optical disk.

FIG. 1 shows a top view of a part of the optical disk used in the preferred embodiments. Guide grooves 101, 103, and 105 have been formed in advance in spiral shape on the optical disk and regions 102 and 104 between the guide grooves are the lands. Their widths are drawn exaggeratedly. FIG. 2 illustrates a magnified perspective view of the optical disk, in which both guide grooves and lands are used for information tracks. In FIG. 2 a layer 110 is a record layer which includes a material such as phase transition materials having different reflectivity in the amorphous and crystalline phases. This property allows one to write information signals by varying the intensity of a laser beam. Reference numerals 112, 114, and 116 are guide grooves formed on the optical disk and 113 and 115 are lands, the widths of both being almost equal to each other. A reference numeral 117 is a transparent substrate made of polycarbonate, for example. The laser beam is incident on the substrate from the bottom. A reference numeral 118 is a record mark created in the guide groove or land. The record mark is defined as a region of record layer 110 which is turned to the amorphous phase by the laser beam irradiation.

Figure 3:
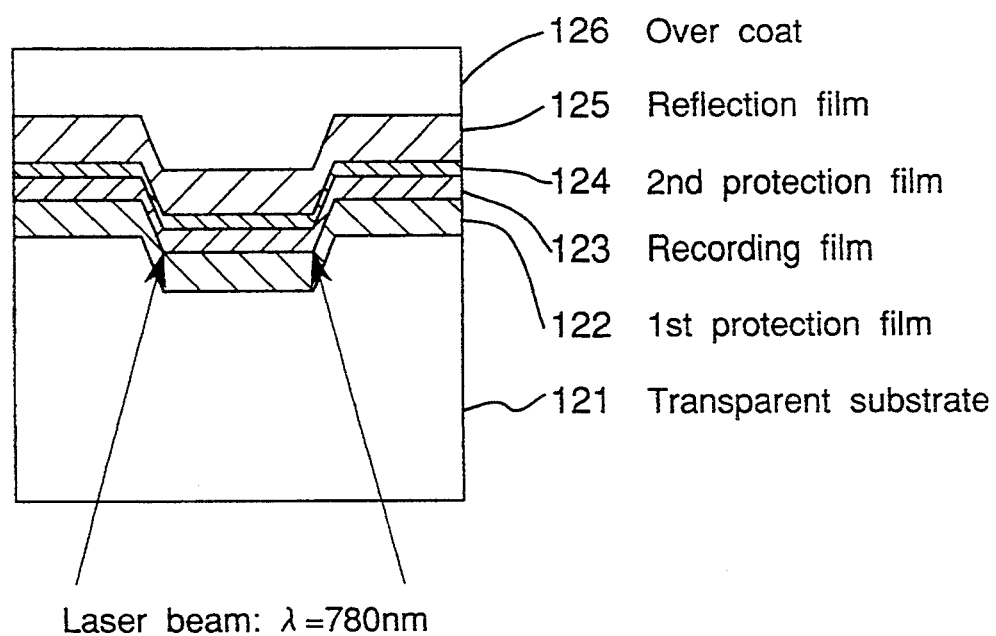
FIG. 3 shows a magnified cross section of said optical disk.

FIG. 3 shows a magnified cross section of the optical disk along the points A and B in FIG. 1, mainly illustrating a structure of the record layer. A reference numeral 121 is a transparent substrate. Glasses and resins are used for transparent substrate 121. More particularly, transparent glasses, quartz, polycarbonate, polymethylmethacrylate, etc. are ordinarily used. A reference numeral 122 represents a first protection film, 123 a record film, and 124 a second protection film. First and second protection films 122 and 124 are made of dielectric materials such as oxides of metalloids, nitrides, chalcogenides, carbides, and their mixtures, more specifically, $SiO_2$, SiO, $Al_2O_3$, $GeO_2$, $In_2O_3$, $TeO_2$, $TiO_2$, $MoO_3$, $WO_3$, $ZrO_2$, $Si_3N_4$, AlN, BN, TiN, ZnS, CdS, CdSe, ZnSe, ZnTe, AgF, $PbF_2$, $MnF_2$, $NiF_2$, SiC or their mixtures. Particularly, ZnS, $SiO_2$, $Si_3N_4$, AlN, TiN, a mixture of ZnS and $SiO_2$, and a mixture of ZnSe and $SiO_2$ are suitable because they easily grow a film and have a good thermal stability. Record film 123 is made of alloys of such elements as Te, Se, Sb, and Ge, which undergo a phase transition between an amorphous phase and a crystalline phase, or between two different crystalline phases. More specifically, GeSbTe, InSnTe, GaSb, InGaSb, and AgSbTe are suitable because writing information signals is relatively easy with these materials. A reference numeral 125 is a reflection film, made of a metal such as Au, Al, Ti, Ni, Cr, etc. or their alloys. Some optical disks may not include a reflection film. A reference numeral 126 is an overcoat made of a UV hardening resin. FIG. 3 is drawn with the vertical direction (the direction of the film thickness) more magnified than the horizontal direction (the direction of the disk radius).

Figure 4:
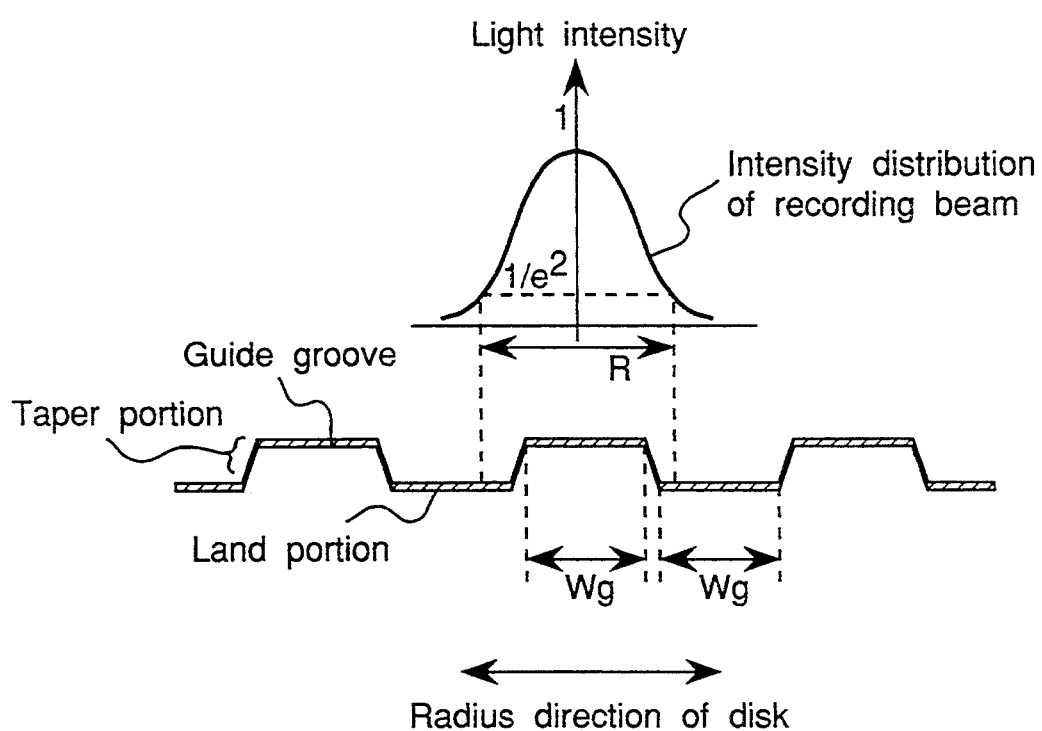
FIG. 4 shows the relationship between the write beam spot size and the cross sectional dimensions of the guide grooves and lands of said optical disk.

FIG. 4 shows the relationship between the write beam spot size and the cross sectional dimensions of the guide grooves and lands of the optical disk in the preferred embodiments. The widths of the leveled portions of the guide grooves and lands are denoted as $W_g$. The beam spot diameter is defined as the diameter at which the intensity of the beam reduces to $1/e^2$ of the intensity of the center of the beam and is denoted as R. In the following preferred embodiments we assume $W_g$ to be 0.7 μm. The boundary between the guide groove and land forms a slope, which is referred to as the taper portion. The width of the taper portion is approximately 0.1 μm. The depth of the guide groove is approximately 84 nm, which corresponds to the optical length of 0.13 μm with the index of refraction of polycarbonate being 1.58.

Next the method of writing information signals on the phase transition optical disk will be described below. In the preferred embodiments of the present invention record marks are created on the record film by modulating the laser beam power between the erase and write levels depending on input signals. Referred to as the single-beam overwrite, this scheme writes new record marks on top of old ones. The advantage of this scheme is high speed of writing due to simultaneous write and erase. A detailed description of the single-beam overwrite is found in the paper, "High Speed Overwritable Phase Change Optical Disk Material", Japanese J. Appl. Phys., Vol. 26 (1987) Supplement 26-4.

Figure 5:
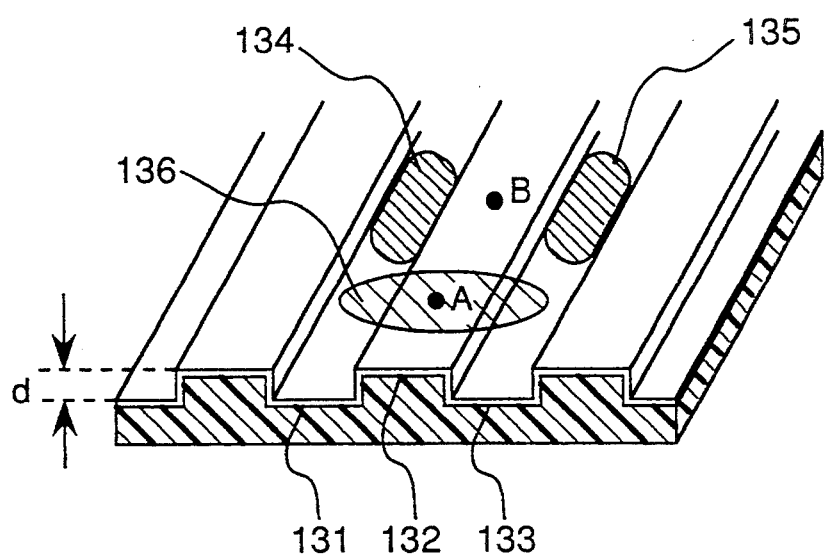
FIG. 5 illustrates a schematic view to explain the suppression of the cross talk of said optical disk.
Figure 6:
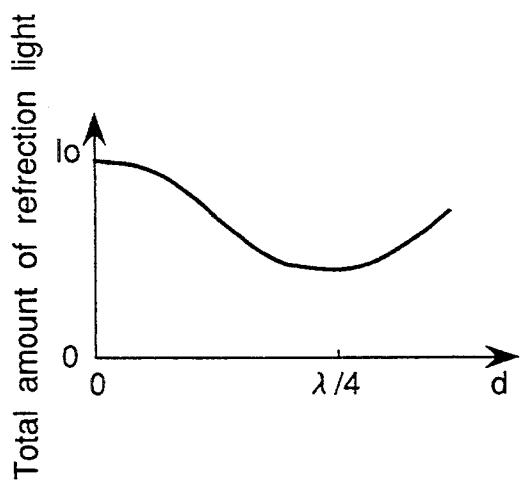
FIG. 6 shows the relationship between the total reflected light intensity and the depth of the track (measured in the optical length) of said optical disk when the adjacent tracks have no record marks.
Figure 7:
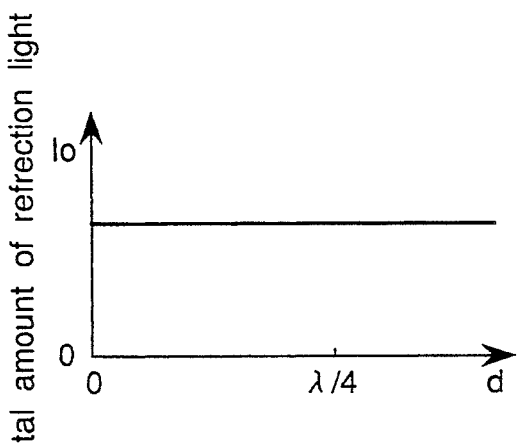
FIG. 7 shows the relationship between the total reflected light intensity and the depth of the track (measured in the optical length) of said optical disk when the adjacent tracks have record marks.
Figure 8:
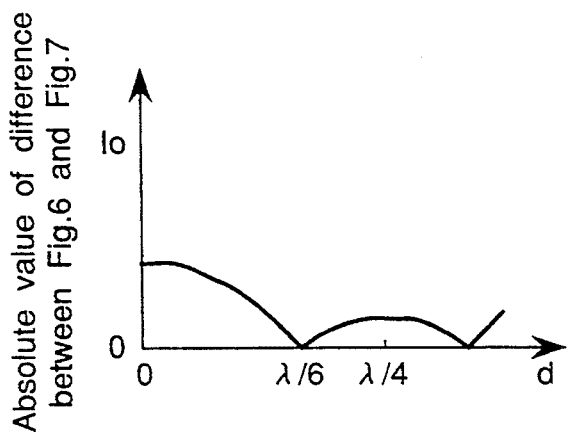
FIG. 8 shows the relationship between the difference of the total reflected light intensities and the depth of the track (measured in the optical length) of said optical disk.

The reason for so setting the depth of the guide groove will be described in detail. FIG. 5 is a schematic view of the optical disk. Now assuming that a beam is tracing guide groove 132, we analyze the cross talk from lands 131 and 133. The depth of the guide groove gives rise to an optical phase difference between land 131 and guide groove 132. We also assume that there is no record mark at positions on lands 131 and 133 right next to the point A, while there are record marks 134 and 135 next to the point B. In order to make the description simpler we further assume that the reflectance of the record mark is 0% and that of the part having no record mark is 30% and that there is no record mark on guide groove 132. When the beam spot is at the point A, the beam is reflected from lands 131 and 133 and guide groove 132. If the depth of the guide groove were zero, the simple sum of the intensities of the individual reflected beams would be the total intensity of the reflected beam to be observed, which is denoted as $I_O$. As the depth increases, interference between the reflected beams sets in due to their phase difference and the intensity observed by a photo detector reduces. When the phase difference is close to $\pi$, the cancellation becomes large and the total intensity of the reflected beams becomes less than the intensity of the beam reflected from only the guide groove. When the phase difference is $\pi$, that is, when the depth of the track is $\lambda/4$ in optical length, the total intensity is minimal. FIG. 6 shows the relationship between the depth of the track and the total intensity of the reflected beams. When the beam spot is at the point B, there is no reflection from lands 131 and 133 because the record marks have zero reflectance. The total reflected intensity comes from only guide groove 132. Thus the total intensity is independent of the track depth. FIG. 7 shows the relationship between the depth of the track and the total intensity of the reflected beams. The cross talk is regarded as the difference in the total intensity of the reflected beams between a case in which a point has record marks directly next to it on the adjacent information tracks and another case in which the point does not have record marks on the adjacent information tracks. Therefore, the difference between FIG. 6 and FIG. 7 represents the cross talk. FIG. 8 shows the relationship between the difference of the two figures (absolute value) and the track depth. It indicates that as the depth increases from zero, the cross talk decreases, reaching zero when the total intensities from the points A and B coincide with each other. Therefore, if the guide grooves are formed with the depth so determined, the cross talk will be minimal.

Figure 9:
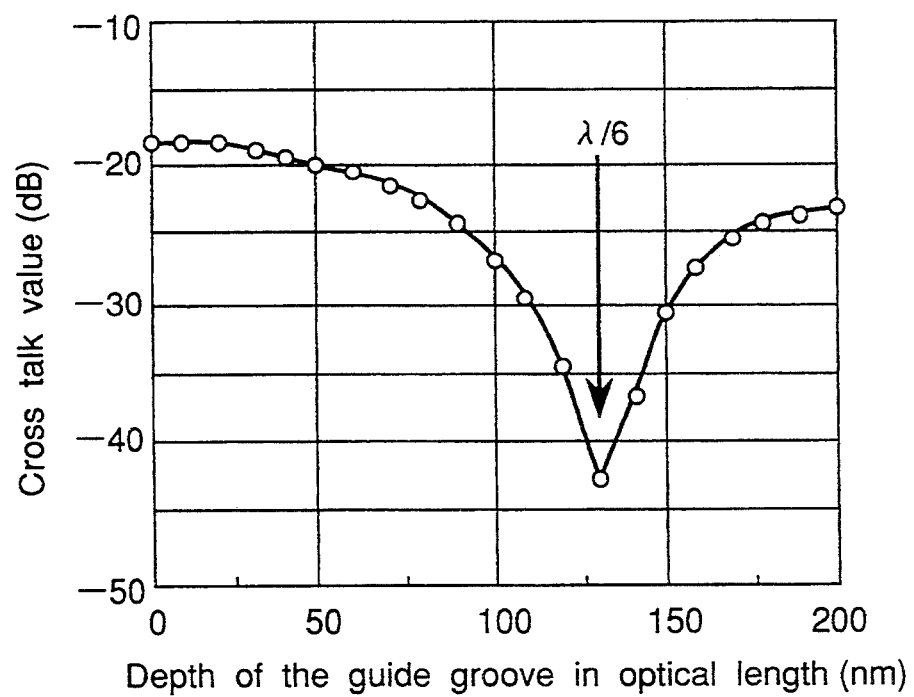
FIG. 9 shows the relationship between the cross talk and the depth of the track (measured in the optical length) obtained by calculation based on the wave optics.

FIG. 9 shows the relationship between the guide groove depth in optical length and the cross talk obtained by simulation based on scalar wave optics using the configuration and parameters of the actual optical head and the shape of the guide groove. We followed the method described by V. J. Jipson and C. C. Williams in "Two-dimensional modeling of an optical disk read out", Applied Optics Vol. 22, No. 14, pp. 2202 (15 July, 1983). The wavelength $\lambda$ was assumed to be 780 nm, the pitch of the guide grooves 1.6 μm, the widths of the guide groove and land 0.7 μm, the NA of the focusing lens 0.55, and the period of record marks 6.6 μm with its shape being an oblong of the width of 0.7 μm. The reflectance of the record mark was assumed to be 15% and that of the region with no record mark 30%. The simulation indicates that the minimal cross talk occurs at the guide groove depth of 130 nm or $\lambda/6$. When the depth is in the range between 100 nm and 160 nm (approximately $\lambda/8$ -$\lambda/4.7$), the cross talk is less than $-26$ dB which is the normally allowable upper limit. Particularly, when it is between 110 nm and 150 nm (approximately $\lambda/7$-$\lambda/5.2$), the cross talk is less than $-30$ dB, which provides a good margin. The actual reflectance can be different from those mentioned above.

After intensive study to solve the drawbacks of the prior art, we found that the scheme of writing information signals on both guide grooves and lands is successfully applicable to erasable optical information storage media by specifying the shape of the guide grooves on the media and the structure of the media.

First, $W_g$ is set so that Inequality (1) is satisfied.

$$0.34 \leq W_g/R \leq 1.0 \tag{1}$$

Let the wavelength of the laser beam be $\lambda$ and the numerical aperture of the object lens in use for focusing the laser beam NA. Then the diameter R (the diameter at which the intensity of the laser beam reduces to $1/e^2$ of the intensity of the center of the beam) of the write beam spot on the record surface is given by Equation (2), if the laser beam has a uniform intensity distribution.

$$R = 0.82 \times \lambda/NA \tag{2}$$

Figure 10:
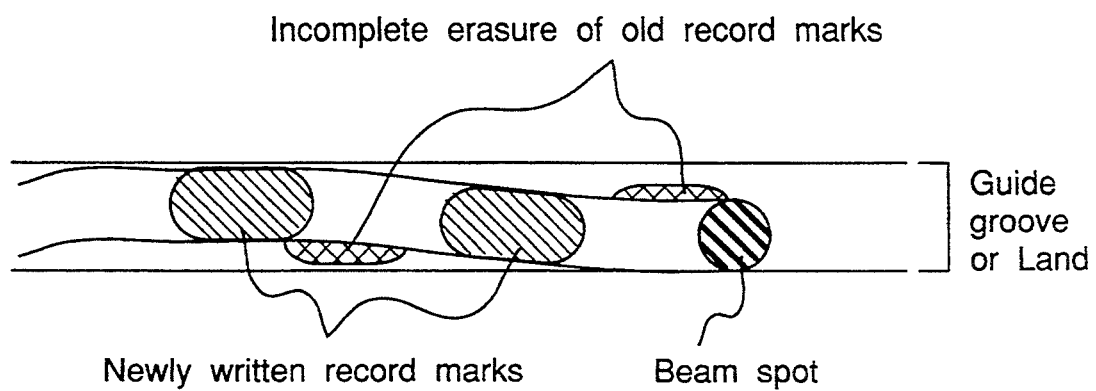
FIG. 10 illustrates how old record marks are incompletely erased by a wobbling beam.

When $W_g/R$ is greater than 1, that is, when the width of the guide grooves or lands is wider than the write beam spot diameter R, the differential tracking error signals are reduced, and tracking deviation increases even if tracking control is engaged. In the single-beam overwrite scheme incomplete erase may occur resulting in increase of jitters of read signals and hence error rate of read signals. As the record mark written by the beam spot having the beam diameter R has a width of approximately R also, incomplete erase of old record marks will occur as shown in FIG. 10. The wider $W_g$ is in comparison with R, the more the deviation of the beam spot is, causing the error rate to increase proportionally to $W_g$.

If $W_g/R$ is less than 0.34, ⅓ of the beam spot overlaps on the adjacent track. In the phase transition type optical disk formation of a record mark starts at the center of the beam spot spreading toward the circumference and stops normally at the taper portion of the guide grooves. If ⅓ of the beam spot overlaps with the next track, however, a record mark is created on the next track causing partial erase of a signal there and giving rise to increase of the read error rate.

In the present invention an appropriate setting of $W_g$ as shown in Inequality (1) prevents read signals from degrading. It allows one to write information signals on both guide grooves and lands of even erasable optical disk in good condition and provides high density recording.

Figure 11:
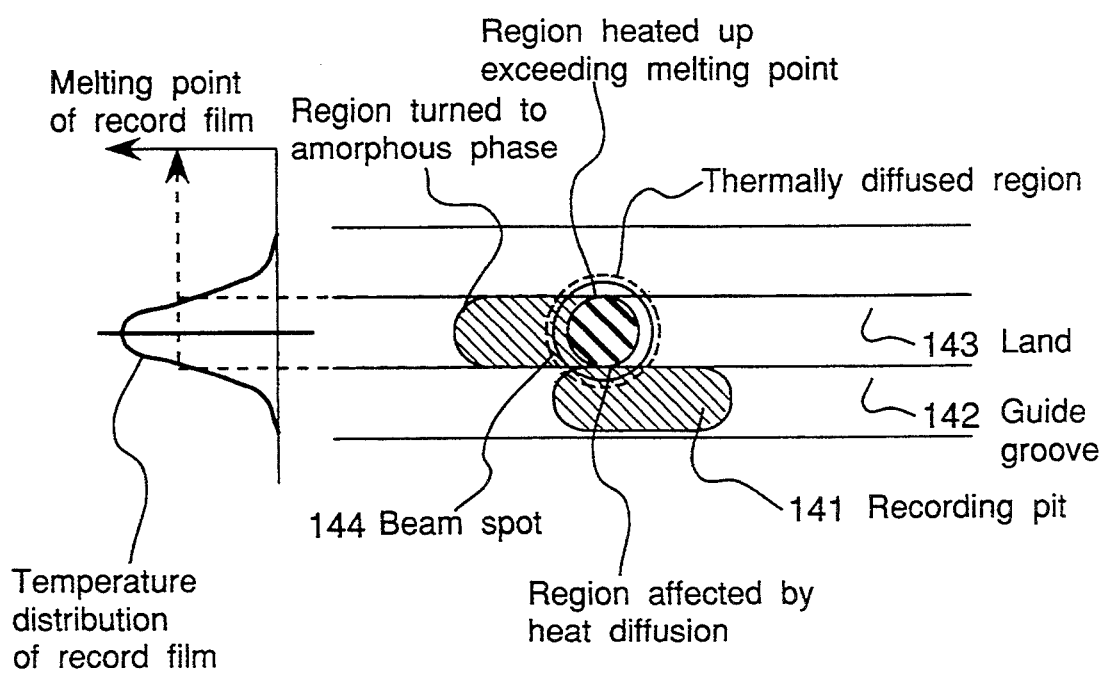
FIG. 11 shows a magnified top view of the optical disk illustrating erasure of marks on the adjacent track.

Secondly, the thickness of the record film is set to be relatively thin, between 5 nm and 50 nm because we found that if the thickness is greater than that the heat is not dissipated in the direction of the thickness but diffused to the next information track where record marks are partially erased. FIG. 11 illustrates a magnified top view of the optical disk to explain the next track erasure. Reference numerals 141, 142, 143, and 144 are a record mark, a guide groove, a land, and a beam spot, respectively. Beam spot 144 heats up record film 123 of land 143, which melts at the melting point and then turns into the amorphous phase during the cooling process thus forming a record mark. If the record film has a good thermal conductivity, the heat generated at land 143 by the beam spot to melt the record film there may diffuse to guide groove 142 and erase part of a record mark on groove 142. In the present invention the record film is specified to have a limited thickness so that the overwrite operation does not partially erase record marks on the next information track.

Thirdly, as the reflection film is made of a metal film of a high thermal conductivity, the heat is more easily diffused in the direction of the film thickness. Consequently, erasure of record marks on the next tracks in overwrite operation is prevented by spreading the heat over a wider region of the record film.

The preferred embodiments of the present invention will be described below.

Embodiment 1

The optical disk of this embodiment has the same structure as shown in FIG. 3. Substrate 121 is a polycarbonate substrate having guide grooves formed in advance. Record film 123 is made of a GeSbTe alloy and 25 nm thick. Protection films 122 and 124 are made of a mixture of ZnS and $SiO_2$ including 20 mole % $SiO_2$. Protection films 122 and 124 are 110 nm and 18 nm, respectively, in thickness. Reflection film 125 is made of Al and 150 nm thick. The depth of the guide groove is approximately 84 nm.

Figure 12:
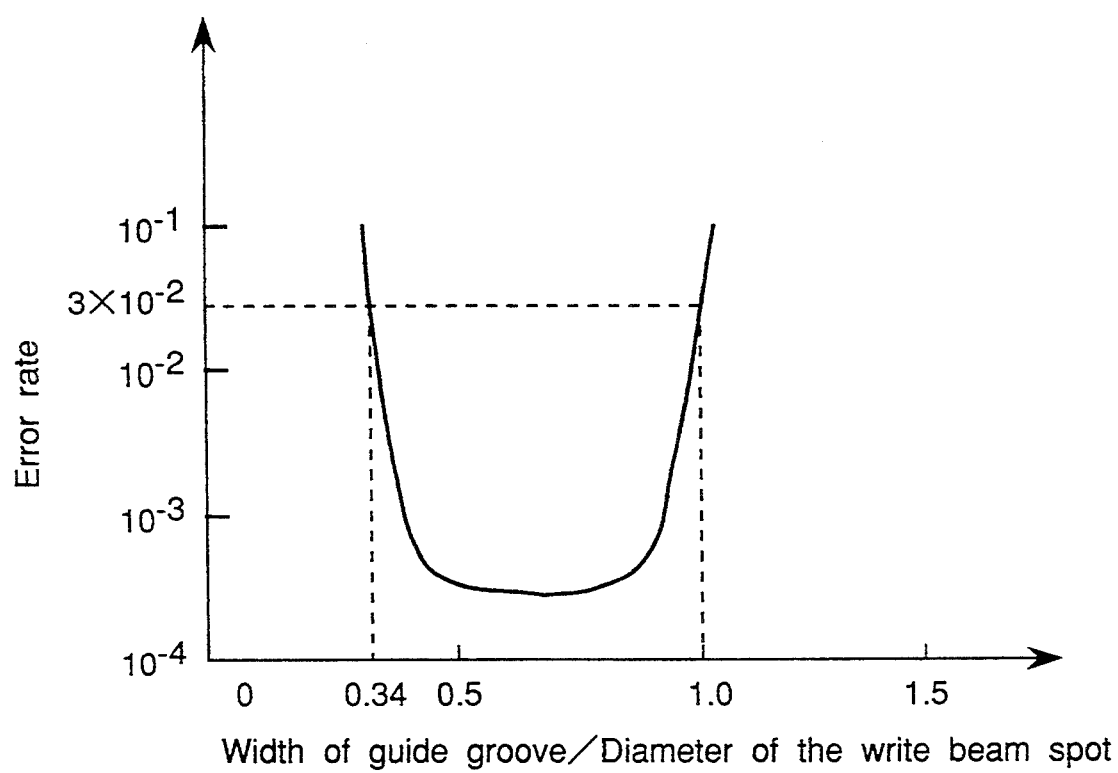
FIG. 12 shows the error rate characteristic as a function of the ratio of the guide groove width to the write beam spot diameter in the first preferred embodiment.

FIG. 12 shows the read error rate as a function of $W_g/R$ for the optical disk used in this embodiment which has the same structure as shown in FIG. 3. It indicates that so as to meet the upper limit of 3% error rate of the CD Standard the $W_g/R$ must be between 0.34 and 1.0. When $W_g/R$ is less than 0.34, the beam spot overlaps with the adjacent tracks and partially erases record marks there giving rise to increase of error rate. When $W_g/R$ is greater than 1.0, the track width is wider than the beam spot and incomplete erase will take place in single-beam overwrite resulting in increase of error rate. We performed an experiment in which signals were written first on a guide groove and then on the adjacent lands one thousand times and the error rate of the signals of the guide groove was measured. The result was in agreement with the conclusion mentioned above.

The measurement method of the error rate is described below. The EFM signals were written in the single-beam overwrite scheme on an optical disk used in this embodiment which was rotating at the rate of 1.25 m/sec. The signals were written first on a land and then on the adjacent guide grooves one thousand times and then the signals on the land were read. Compact Disk (CD) Standard uses the EFM signals which include nine kinds of pulses, 3T ~11T, (T represents a period) of different pulse widths (Refer to the International CD Standard IEC-908). The laser used for reading had a wavelength of 780 nm. The NA of the object lens was 0.55. We used the model DR-3553 of Kenwood Corporation, Ltd. and measured the number of block errors per second to plot the read error rate.

Embodiment 2

Figure 13:
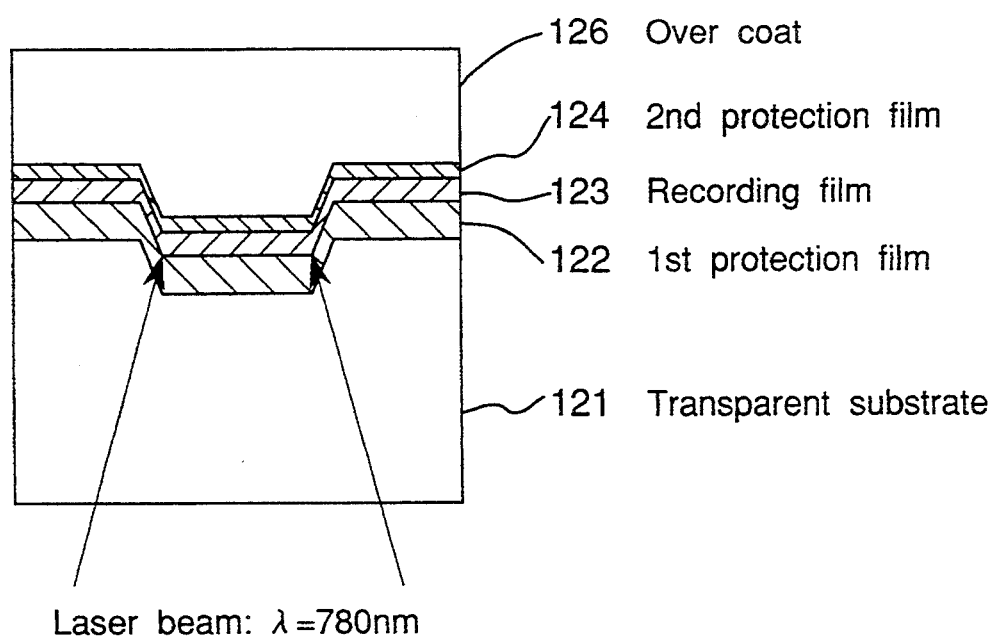
FIG. 13 illustrates a magnified cross sectional view of the optical disk in the second preferred embodiment.
Figure 14:
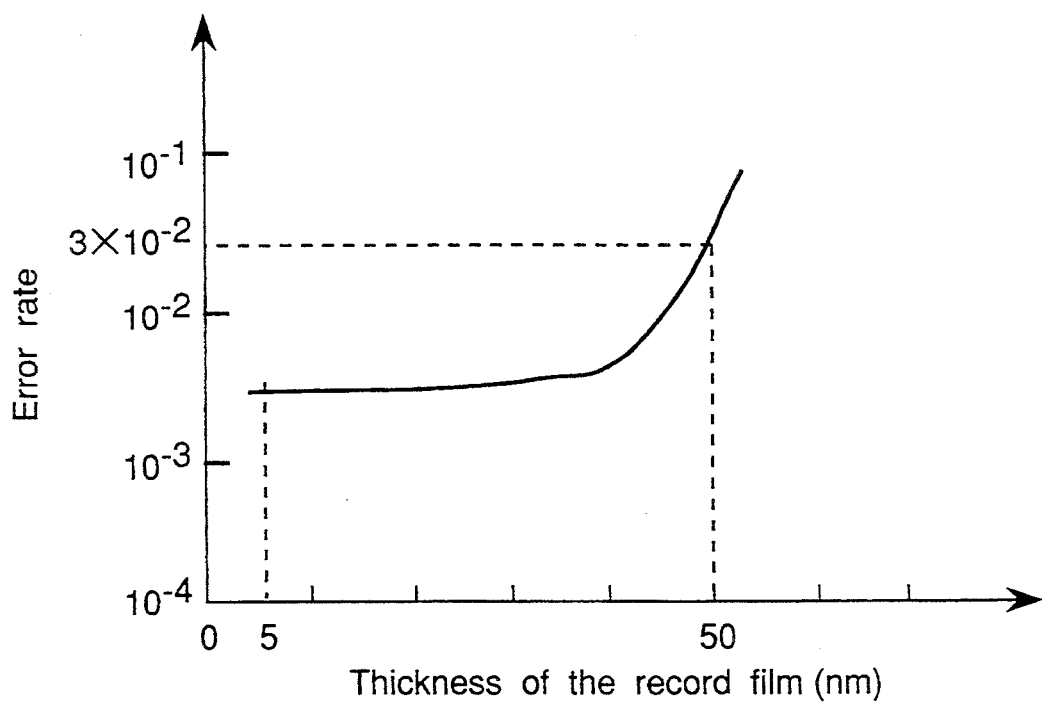
FIG. 14 shows a measured result of the error rate of the read signals as a function of the thickness of the record film in the second preferred embodiment.

FIG. 13 shows a structure of the optical disk of this embodiment. Substrate 121 is a polycarbonate substrate. Record film 123 is made of an alloy of GeSbTe. Protection films 122 and 124 are made of a mixture of ZnS and $SiO_2$ including 20 mole % $SiO_2$ and are 110 nm and 18 nm, respectively, in thickness. $W_g$ is approximately 0.7 $\mu$m, the width of the taper portion approximately 0.1 $\mu$m, and the depth of the guide grooves approximately 84 nm. With this structure in this embodiment we measured the read error rate as a function of the thickness of the record film. FIG. 14 shows the result of the experiment. It indicates that so as to meet the upper limit of 3% error rate of the CD Standard the film thickness must be less than 50 nm. If it is thinner than 5 nm, the film poorly absorbs the laser beam while the thermal radiation is relatively large. Consequently, the write sensitivity (the laser power needed to form a record mark) decreases. Therefore, we must use a higher power laser source than a conventional diode laser, resulting in higher cost of lasers. Hence the film of thickness less than 5 nm is not a practical choice.

For the measurement of the error rate we used the same method in this embodiment as that used in the embodiment 1.

Embodiment 3

Figure 15:
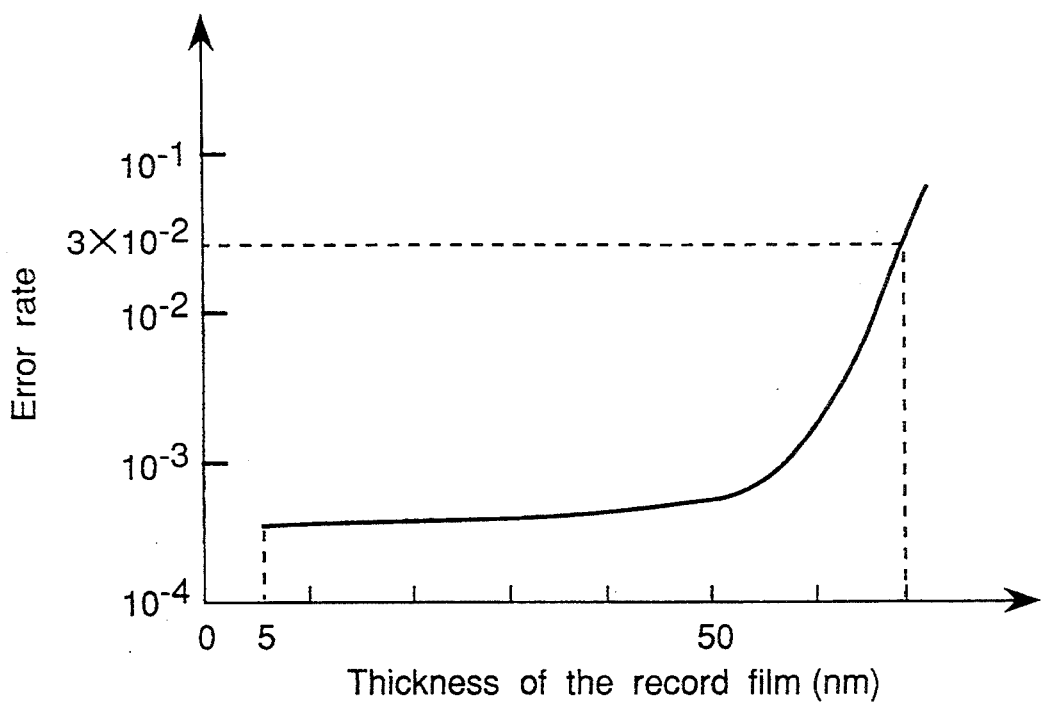
FIG. 15 shows a measured result of the error rate of the read signals as a function of the thickness of the record film in the third preferred embodiment.

In this embodiment we measured the error rate as a function of the thickness of the record film of the optical disk including an Al reflection film having a high thermal conductivity as shown in FIG. 3. Substrate 121 is a polycarbonate substrate. Record film 123 is made of a GeSbTe alloy. Protection films 122 and 124 are made of a mixture of ZnS and SiO$_2$ including 20 mole % SiO$_2$ and are 110 nm and 18 nm, respectively, in thickness. Reflection film 125 is made of Al and 150 nm thick. W$_g$ is approximately 0.7 μm, the width of the taper portion approximately 0.1 μm, and the depth of the guide grooves approximately 84 nm. With the Al film playing a roll of a heat sink the heat can diffuse easily in the direction of the thickness, and it prevents thermal erasure of the next information tracks. FIG. 15 shows the result of the measurement of the error rate as a function of the thickness of the record film. It indicates that the error rate of this embodiment is superior to that shown in FIG. 14, where an Al film is not formed in the structure of the optical disk and that the thickness less than 70 nm meets the CD Standard.

For the measurement of the error rate we used the same method in this embodiment as that used in the embodiment 1.

Embodiment 4

Figure 16:
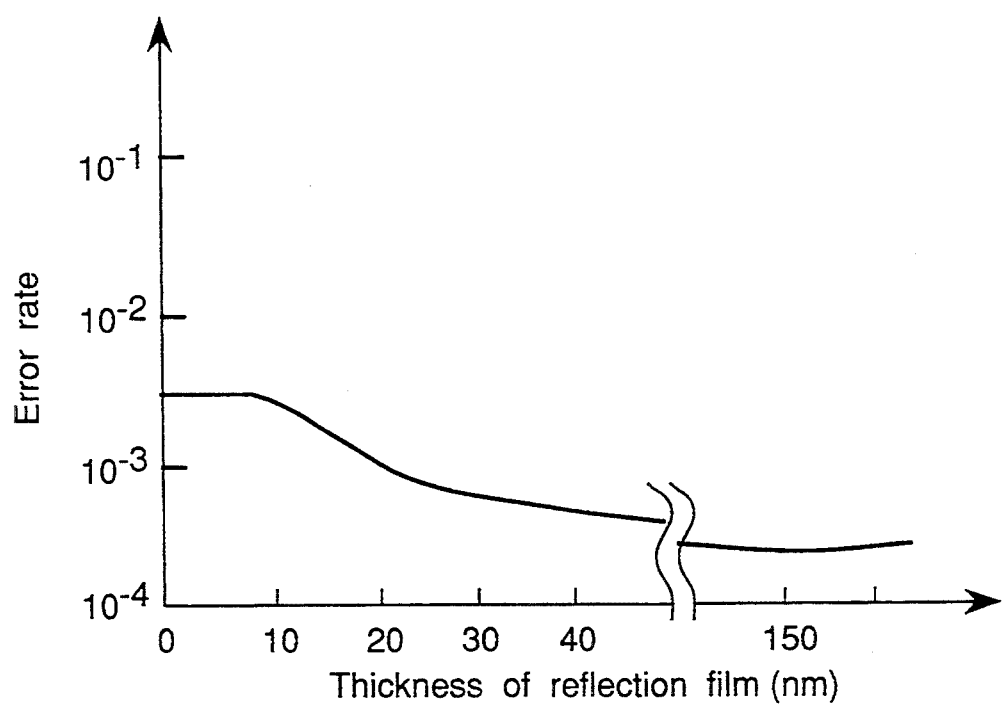
FIG. 16 shows a measured result of the error rate of the read signals as a function of the thickness of the reflection film in the fourth preferred embodiment.

In this embodiment we measured the error rate of the optical disk as shown in FIG. 3 as a function of the thickness of the Al film. Substrate 121 is a polycarbonate substrate. Record film 123 is made of a GeSbTe alloy and 25 nm in thickness. Protection films 122 and 124 are made of a mixture of ZnS and SiO$_2$ including 20 mole % SiO$_2$ and are 110 nm and 18 nm, respectively, in thickness. Reflection film 125 is made of Al. W$_g$ is approximately 0.7 μm, the width of the taper portion approximately 0.1 μm, and the depth of the guide grooves approximately 84 nm. FIG. 16 shows the result of the measurement of the read error rate as a function of the Al film thickness. The method of the measurement is the same as that described in the embodiment 1. FIG. 16 indicates that when the thickness exceeds 10 nm the heat sink effect as mentioned in the embodiment 3 sets in and the error rate starts decreasing. The reason for the larger error rate for the thinner thickness is that the small thermal capacity of the film cannot take away quickly enough the heat generated in the record film.

The reflection films made of other metals (Au, Ti, Ni, Cr, and so on) demonstrated the same effect over the thickness of 10 nm.

Embodiment 5

Figure 17:
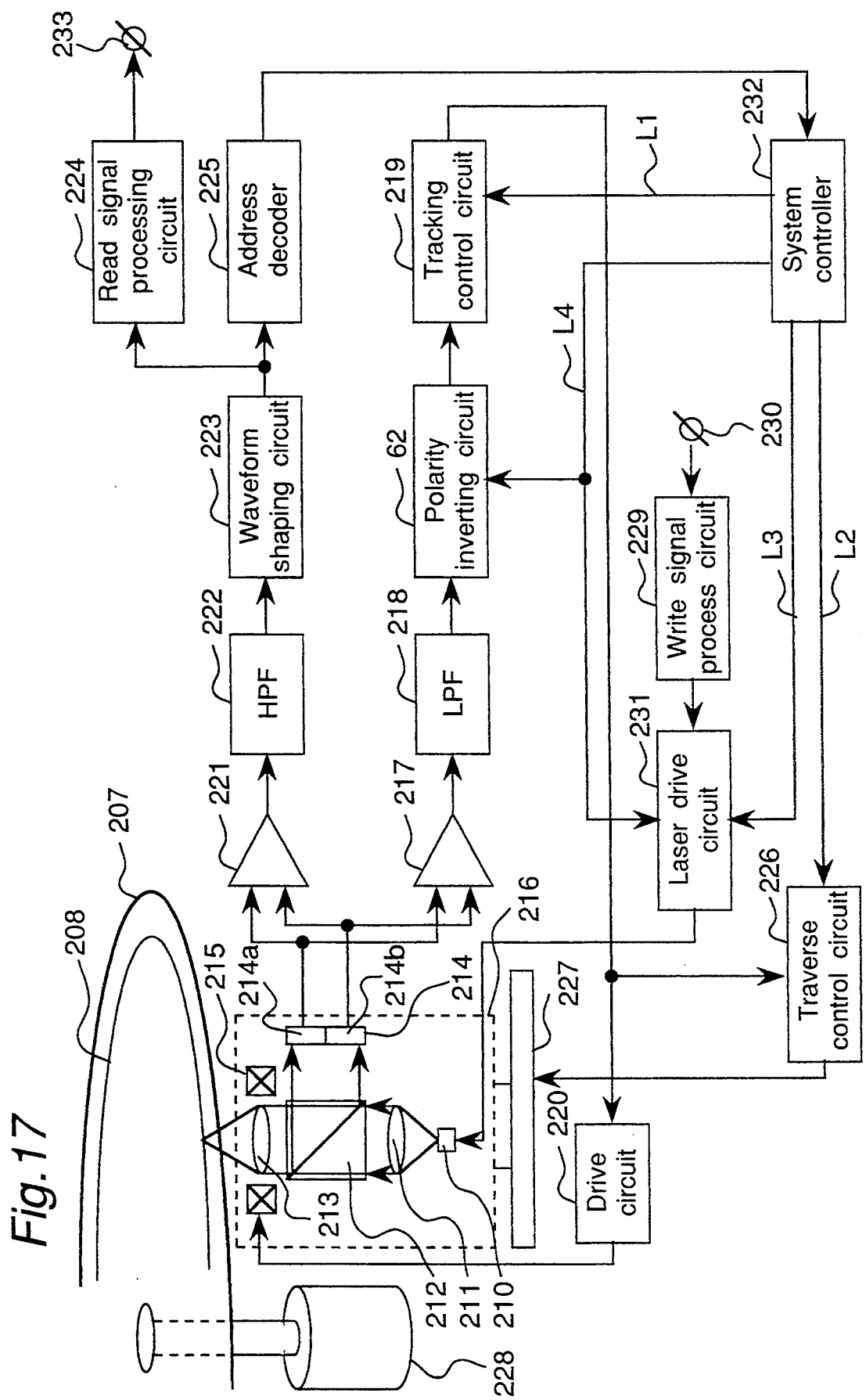
FIG. 17 illustrates a block diagram of the optical information read/write device in the fifth preferred embodiment.

Now we will describe the optical information read/write device in use for reading and writing information in the optical disks used in the embodiments of the present invention. FIG. 17 illustrates a block diagram of the optical information read/write device. In the figure a numerical reference 207 is an optical disk of the present invention, 208 an information track which is a guide groove in this case, 210 a diode laser, 211 a collimator lens for collimating the laser beam emitted by diode laser 210, 212 a half mirror arranged in the optical flux, and 213 an object lens for focusing the collimated optical beam through half mirror 212 onto the record surface of optical disk 207. Reference numeral 214 is a photo detector for the beam reflected from optical disk 207 and transmitted through object lens 213 and half mirror 212. Photo detector 214 comprises two photo detectors 214a and 214b which are placed parallel to the tracks to obtain the tracking error signal. Reference numeral 215 is an actuator to support object lens 213. Diode laser 210, collimator lens 211, half mirror 212, object lens 213, photo detector 214, and actuator 215 are mounted on a head base and constitute optical head 216. Reference numeral 217 is a differential amplifier which the signals from photo detectors 214a and 214b are fed to, and 218 a low-pass filter (LPF) which the difference signals generated at differential amplifier 217 are fed to. Reference numeral 62 is a polarity inverting circuit which receives the tracking error signals form LPF 218 and the control signal L4 from system controller 232 to be explained below and outputs error signals to tracking control circuit 219. The polarity of the tracking error signals when the beam spot is on the guide groove is made to be opposite to that when the beam spot is on the land. If the tracking error signal fed to tracking control circuit 219 has the same polarity as the difference signal from differential amplifier 217, tracking control circuit 219 determines that the beam spot is on a guide groove information track. Tracking control circuit 219 has two inputs, the output from polarity inverting circuit 62 and control signal L1 from system controller 232 which will be explained below, and outputs tracking control signals to drive circuit 220 and traverse control circuit 226 which will be explained also below. Drive circuit 220 outputs drive currents to actuator 215. Reference numeral 221 represents a summing amplifier which adds the output signals from photo detectors 214a and 214b. Reference numeral 222 represents a high-pass filter (HPF) which receives the sum signal from summing amplifier 221 and outputs its high-frequency components to waveform shaping circuit 223 to be described below. Reference numeral 223 is a waveform shaping circuit which receives the high-frequency components of the sum signals from HPF 222 and outputs digital signals to read signal processing circuit 224 and address decoder 225. Reference numeral 224 is a read signal processing circuit which outputs information signals such as voice signals to output terminals 233. Reference numeral 225 is an address decoder which receives digital signals from waveform shaping circuit 223 and outputs address signals to system controller 232 to be described below. Reference numeral 226 is a traverse control circuit which receives control signal L2 from system controller 232 to be described below and outputs drive currents to traverse motor 227 to be described below. Reference numeral 227 is a traverse motor which moves optical head 216 along the radial direction of optical disk 207. Reference numeral 228 is a spindle motor for rotating optical disk 207. Reference numeral 229 is a write signal processing circuit which receives information signals such as voice signals from external input terminals 230 and outputs write signals to laser drive circuit 231 to be described below. Reference numeral 231 is a laser drive circuit which receives control signals L3 and L4 from system controller 232 and write signals from write signal processing circuit 229 and outputs drive currents to diode laser 210. Reference numeral 232 is a system controller which outputs control signals L1, L2, L3, and L4 to tracking control circuit 219, traverse control circuit 226, laser drive circuit 231, and polarity inverting circuit 62, respectively, receiving address signals from address decoder circuit 225.

Now the operation of the optical information read-/write device so configured will be explained with reference to the same diagram.

The laser beam emitted by diode laser 210 is collimated by collimator lens 211, passes through beam splitter 212, and is focused on optical disk 207 by object lens 213. The optical beam reflected from optical disk 207, carrying information of information track 208 due to diffraction, passes through object lens 213 and is led to photo detector 214 by beam splitter 212. The intensities of the optical beam incident on photo detectors 214a and 214b are converted to electrical signals which are fed to differential amplifier 217 and summing amplifier 221. Differential amplifier 217 converts each current input to a voltage signal, then takes their difference, and outputs it in the push-pull signal. LPF 218 filters the push-pull signals and passes their low-frequency components to polarity inverting circuit 62 as tracking error signals. System controller 232 determines whether the present address sector is on a land or a guide groove by referring to the address map and outputs a indication signal as L4. Here we assume L4 to be a Lo level when the beam spot is on a guide groove and a Hi level when it is on a land. If a start address is for a land, polarity inverting circuit 62 changes the polarity of input signals, while if a start address is for a guide groove it does not, and then polarity inverting circuit 62 outputs the signals to tracking control circuit 219. Corresponding to the levels of the input tracking error signals, tracking control circuit 219 outputs tracking control signals to drive circuit 220, which in turn outputs drive currents to actuator 215 responding to the signals, the actuator moving object lens 213 across the track to the correct position. Thus the beam spot correctly traces the track whether a guide track or land. A focus control circuit (not shown) controls the vertical position of object lens 213 so that the beam spot is always focused correctly on the optical disk.

Summing amplifier 221 converts the output current signals from photo detectors 214a and 214b to voltage signals, adds them, and then outputs the sum signals to HPF 222. HPF 222 filters out low frequency components and passes main data signals and address signals in analog form and outputs to waveform shaping circuit 223. Waveform shaping circuit 223 converts the analog main data and address signals to pulsed signals by data slice using a fixed threshold and outputs them to read signal processing circuit 224 and address decoder 225. Read signal processing circuit 224 demodulates the input digital main data signals, performs error correction and other operations on them, and outputs the modified signals to output terminals as voice signals or other forms of signals. Address decoder 225 demodulates the input digital address signals, and outputs to system controller 232 to provide position information on the optical disk. That is, when the beam spot scans record marks, data signal processing circuit 224 receives data signals, and when the beam spot scans prepits, address decoder 225 receives address signals. System controller 232 determines whether the optical beam is on the seeking address or not based on the address signals from address decoder 225.

Traverse control circuit 226 supplies drive currents, corresponding to the control signals L2 from system controller 232, to traverse motor 227 in order to move the optical head 216 to the target track. During this process control signal L1 from system controller 232 disables the tracking servo control performed by tracking control circuit 219. When reading, traverse control circuit 226 drives traverse motor 227, corresponding to the low frequency components of the tracking error signals from tracking control circuit 219, to move optical head 216 gradually in the radial direction as the reading process proceeds.

Write signal processing circuit 229, when writing, adds error-correcting code to the signals such as voice signals fed to the external terminals 230 and outputs the coded write signals to laser drive circuit 231. If system controller 232 sets laser drive circuit 231 for write mode by control signal L3, laser drive circuit 231 modulates, corresponding to the write signals, the drive currents which are applied to diode laser 210 (For example, the Hi level of L3 may represent write mode). Thus the laser beam incident on optical disk 207 varies in intensity corresponding to the write signals and forms record marks. For reading, however, control signal L3 sets laser drive circuit 231 for read mode and laser drive circuit 231 controls drive currents so that diode laser 210 emits at a constant intensity. This enables one to read record marks and prepits. While these processes are being performed, spindle motor 228 is rotating optical disk 207 at a constant angular velocity.

Figure 18:
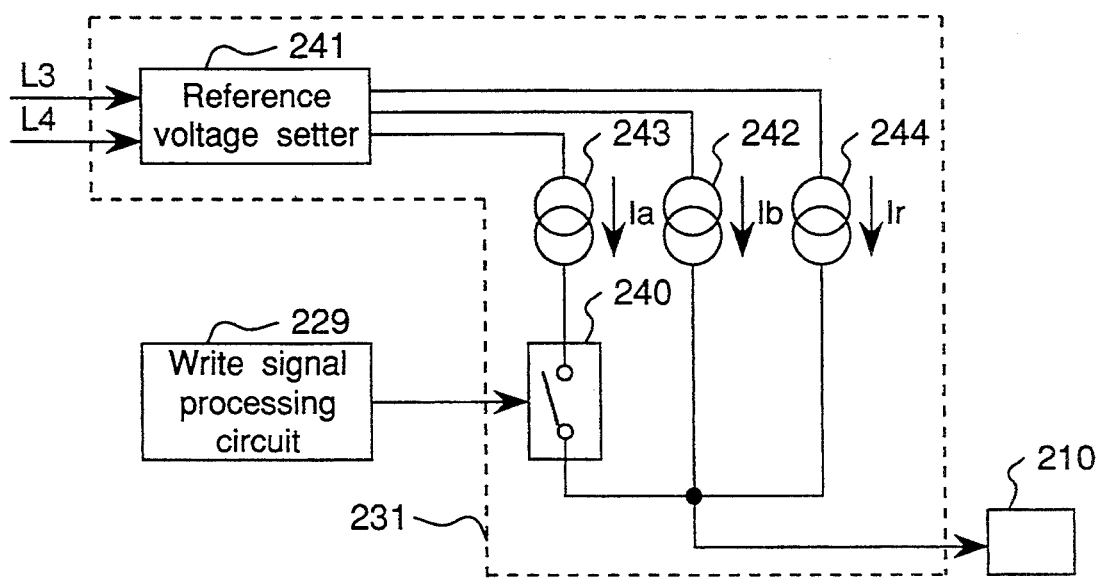
FIG. 18 illustrates a more detailed block diagram of laser drive circuit 231 in the fifth preferred embodiment.
Figure 19:
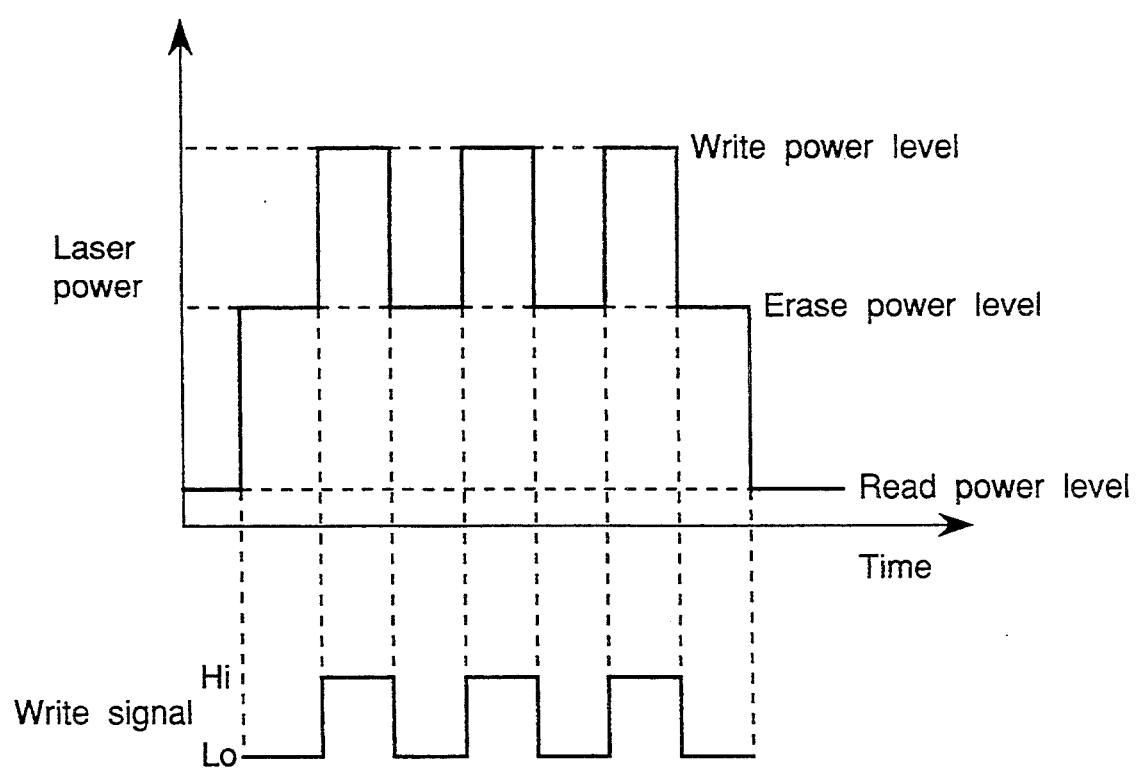
FIG. 19 shows the write signals and the corresponding laser power in the fifth preferred embodiment.

In order to employ the single-beam overwrite scheme in the present embodiment, laser control circuit 231 modulates the intensity of laser diode 210 between the writ power level and the erase power level. FIG. 18 illustrates a detailed block diagram for laser drive circuit 231. When reading information signals on optical disk, control signal L3 having the Lo level is fed to reference voltage setter 241, which in turn applies voltage $V_r$ only to constant-current source 244. Constant-current source 244 supplies read current $I_r$ to diode laser 210, which emits a laser beam at the read level. When writing, control signal L3 having the Hi level is fed to reference voltage setter 241, which in turn applies voltage $V_b$ to constant-current source 242 so that it generates bias current $I_b$. With bias current $I_b$ diode laser operates at the erase power level. When forming record marks, reference voltage setter 241 not only applies voltage $v_b$ to constant-current source 242, but also applies voltage $V_a$ to constant-current source 243 so that it outputs peak current $I_a$. At the same time the modulated signals from write signal processing circuit 229 switch on and off first switch 240. Thus peak current $I_a$ is superposed upon read current $I_r$ and bias current $I_b$, and diode laser 210 operates switching between the write and erase power levels. Record marks are formed at positions which are irradiated with the laser beam having the write power level. FIG. 19 shows a series of write signals and corresponding laser power outputs, where the Hi level of the binary write signals is associated with the write power level of the laser beam and the Lo level the erase power level. That is, record marks are formed during write signals are at Hi levels, while the periods during write signals being at Lo levels correspond to regions between record marks. Because erasure is performed when the write signal is at Lo level, this scheme allows one to write new record marks erasing old ones with a single laser beam.

Figure 20:
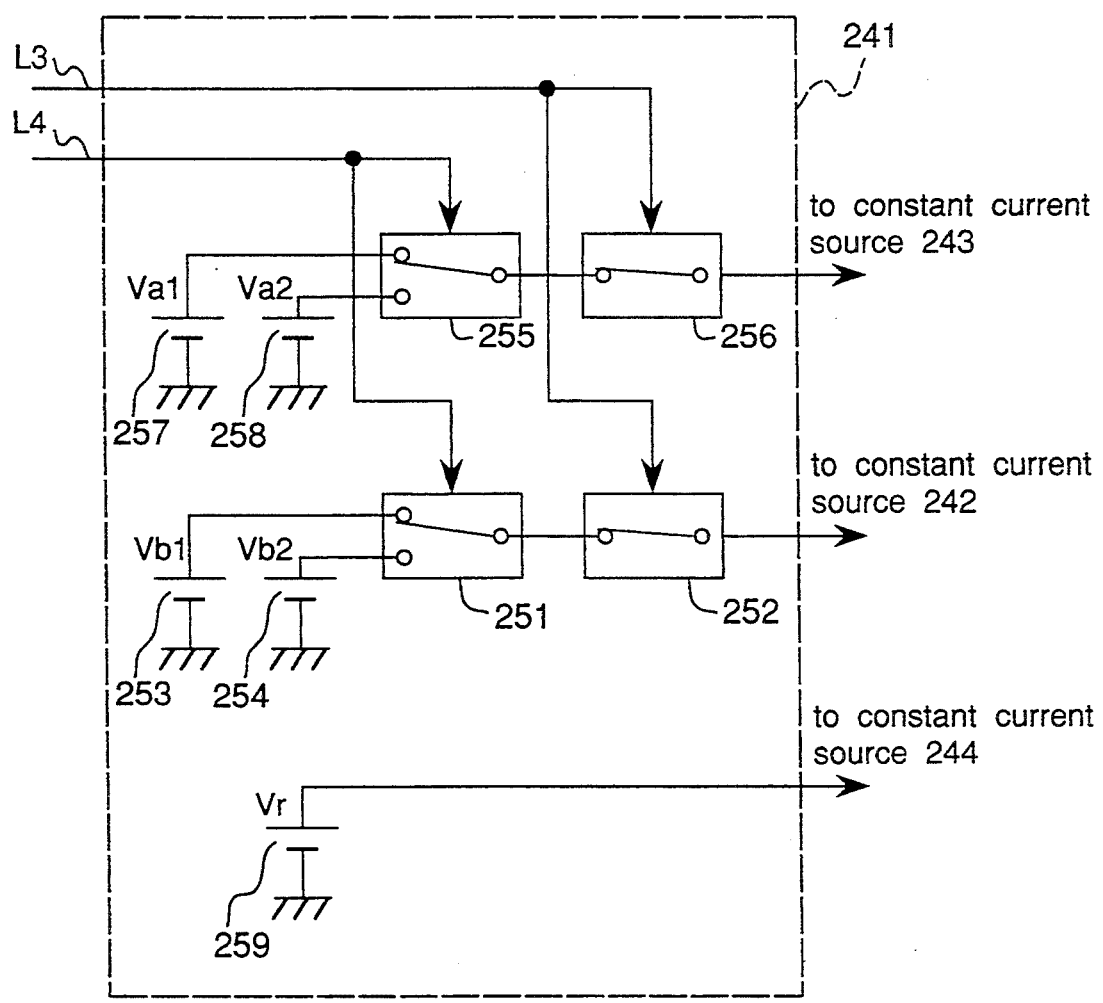
FIG. 20 shows a block diagram of the reference voltage setter in the fifth preferred embodiment.

Different writing wave forms may be used for lands and grooves. More specifically, for example, $V_a$ and $V_b$ may be made variable so that the write and erase power levels for those two cases are different. Thus when the thermal diffusion characteristics are different for the lands and grooves, optimum power levels can be chosen for the each case for writing information signals. FIG. 20 shows a reference voltage setter designed to supply different voltages $V_a$ and $V_b$ for writing on the lands and grooves. When writing information signals on the grooves, control signal L4 induces first selector 251 to select first constant-voltage source 253, and second selector 255 to select third constant-voltage source 257. Control signal L3 switches on second and third switches 252 and 256. Therefore, voltages $V_{b1}$ and $V_{a1}$ are applied to constant-current sources 242 and 243, respectively, in FIG. 18. Voltages $V_{b1}$ and $V_{a1}$ are optimum voltages for erasing and writing information signals on the grooves. When writing information signals on the lands, control signal L4 induces first selector 251 to select second constant-voltage source 254 (voltage $V_{b2}$), and second selector 255 to select fourth constant-voltage source 258 (voltage $V_{a2}$). Therefore, voltages $V_{b2}$ and $V_{a2}$ are applied to constant-current sources 242 and 243, respectively, in FIG. 18. Voltages $V_{b2}$ and $V_{a2}$ are optimum voltages for erasing and writing information signals on the lands. Thus, optimum erase and write power levels of the laser beam are obtained for writing information signals on both lands and grooves. Therefore, suitable record marks are created in either case. Hence this scheme allows one to write information signals in high quality even if the thermal diffusion characteristic of the lands is different from that of the grooves. For example, assume that erase power levels are $P_{b1}$ and $P_{b2}$ for applied voltages $V_{b1}$ and $V_{b2}$, respectively, and that write power levels are $P_{a1}$ and $P_{a2}$ for applied voltages $V_{a1}$ and $V_{a2}$, respectively. If the land has a slower thermal diffusion than the grooves, $V_{b1}$, $V_{b2}$, $V_{a1}$, and $V_{a2}$ are set, so that $P_{b1} > P_{b2}$ and $P_{a1} > P_{a2}$. When reading, control signal L3 switches off second and third switches 252 and 256. Therefore, only voltage Vr generated by fifth constant-voltage source 259 is applied to constant current source 244. Diode laser 210 is driven only with the read current $I_r$ supplied by constant current source 244 and emits a laser beam at the read power level.

Laser drive circuit 231 of the optical information read/write device of the present embodiment switches the laser power level of diode laser 10 between the write power level and erase power level according to the write signals, and optical disk 207 is irradiated with the laser beams having those levels. Optical disk 207 has a structure, as shown in the embodiments 1 through 4, that reduces incomplete erasure of record marks and cross talks from adjacent tracks and allows one to perform the single-beam overwrite of information signals in high quality and in high density.

The present embodiment employs laser drive circuit 231 as shown in FIG. 18. Other type of drive circuit may be used, in which the write power level is modulated with pulses of a shorter period as is shown in U.S. Pat. No. 5,109,373. This method creates record marks of more uniform shape and improves the quality of write signals.

What is claimed is:

1. An optical information recording medium comprising a record film which undergoes a local change in the reflectance with irradiation of an optical beam and guide grooves formed in advance, both said guide grooves and regions between two guide grooves adjacent with each other being used for information tracks, the depth of said guide grooves in optical length being between approximately $\lambda/8$ and $\lambda/4.7$, where $\lambda$ is the wavelength of a read optical beam, the width of said guide groove and the width of said region between the two adjacent guide grooves being approximately equal to each other, satisfying a relationship given as follows:

$$0.34 \leq W_g/R \leq 1.0,$$

where R represents the beam diameter of a write optical beam on said record film as defined as the diameter where the intensity reduces to $1/e^2$ of the intensity of the center of said write optical beam, and where $W_g$ is said width of said guide grooves.

2. The optical information recording medium of claim 1 wherein said record film is made of a phase-change type material that undergoes phase change between an amorphous phase and a crystalline phase.

3. The optical information recording medium of claim 2 wherein a dielectric film, a record film, and another dielectric film are formed in this order on a substrate, the thickness of said record film being between 5 nm and 50 nm.

4. The optical information recording medium of claim 2 wherein a dielectric film, a record film, another dielectric film, and reflection film are formed in this order on a substrate, the thickness of said reflection film being not less than 10 nm.

5. The optical information recording medium of claim 2 wherein a dielectric film, a record film, another dielectric film, and reflection film are formed in this order on a substrate, the thickness of said reflection film being between 5 nm and 70 nm.

6. The optical information recording medium of claim 5 wherein the thickness of said reflection film is not less than 10 nm.

7. An optical information recording medium comprising a record film which undergoes a local change in the reflectance with irradiation of an optical beam and guide grooves formed in advance, both said guide grooves and regions between two guide grooves adjacent with each other being used for information tracks, the depth of said guide grooves in optical length being between approximately $\lambda/7$ and $\lambda/5.2$, where $\lambda$ is the wavelength of a read optical beam, the width of said guide groove and the width of said region between the two adjacent guide grooves being approximately equal to each other, satisfying a relationship given as follows:

$$0.34 \leq W_g/R \leq 1.0,$$

where R represents the beam diameter of a write optical beam on said record film as defined as the diameter where the intensity reduces to $1/e^2$ of the intensity of the center of said write optical beam, and where $W_g$ is said width of said guide grooves.

8. The optical information recording medium of claim 7 wherein said record film is made of a phase-change type material that undergoes phase change between an amorphous phase and a crystalline phase.

9. The optical information recording medium of claim 8 wherein a dielectric film, a record film, and another dielectric film are formed in this order on a substrate, the thickness of said record film being between 5 nm and 50 nm.

10. The optical information recording medium of claim 8 wherein a dielectric film, a record film, another dielectric film, and reflection film are formed in this order on a substrate, the thickness of said reflection film being not less than 10 nm.

11. The optical information recording medium of claim 8 wherein a dielectric film, a record film, another dielectric film, and reflection film are formed in this order on a substrate, the thickness of said reflection film being between 5 nm and 70 nm.

12. The optical information recording medium of claim 11 wherein the thickness of said reflection film is not less than 10 nm.

13. An optical information read/write device comprising
(a) an optical system irradiating an optical information recording medium with an optical beam emitted from a light source said optical information medium having record tracks defined by guide grooves formed concentrically or spirally on a substrate and lands each defined inbetween two guide grooves adjacent with each other and a record film formed on record tracks which undergoes a local change in the reflectance with irradiation of an optical beam,
(b) first means for moving said optical beam along the direction normal to tracks,
(c) second means for relatively moving said optical beam along the direction of the tracks,
(d) means for detecting the lateral deviations of said optical beam from the information track by measuring the reflected beam from or transmitted beam through said optical information recording medium and putting out signals associated with said deviations referred to as first signals,
(e) means for receiving said first signals, inverting the polarity of said first signals so that the polarity when said optical beam is on guide grooves is opposite to the polarity when said optical beam is on regions between two guide grooves adjacent with each other, and putting out the modified signals referred to as second error signals, and
(f) tracking control means for receiving said second error signals and controlling said optical beam moving means so that said optical beam correctly traces the information tracks,
(g) means for writing information signals of series of pulses on said information tracks with irradiation of said optical beam having a light intensity enough for causing said local change to form record marks corresponding to pulse durations of said informations,
(h) means for reading said information with irradiation of said optical beam having a light intensity not causing said local change, and
(i) optical beam intensity control means for controlling the irradiation light intensity of said optical beam upon writing said information signal so that the irradiation light intensity for each pulse space of said information signal is different from that for each duration of said information signal,
wherein the irradiation light intensity of said optical beam upon writing said information signal on each guide groove is differentiated from that upon writing said information signal on each land.

14. The optical information read/write device as claimed in claim 13, wherein the depth of said guide grooves in optical length being between approximately $\lambda/8$ and $\lambda/4.7$, where $\lambda$ is the wavelength of said read optical beam,
the width of said guide groove and the width of said region between the two adjacent guide grooves being approximately equal to each other,
having a relationship given as follows:

$$0.34 \leq W_g/R \leq 1.0,$$

where R represents the beam diameter of said laser beam on said record film as defined as the diameter where the intensity reduces to $1/e^2$ of the intensity of the center of said laser beam, and where $W_g$ is said width of said guide grooves.

15. The optical information read/write device of claim 14 wherein said record film of said optical information recording medium is made of a phase-change type material that undergoes phase change between an amorphous phase and a crystalline phase.

16. The optical information read/write device of Claim 15 wherein said optical information recording medium has a dielectric film, a record film, and another dielectric film formed in this order on a substrate, the thickness of said record film being between 5 nm and 50 nm.

17. The optical information read/write device of claim 15 wherein said optical information recording medium has a dielectric film, a record film, another dielectric film, and reflection film formed in this order on a substrate, the thickness of said reflection film being not less than 10 nm.

18. The optical information read/write device of claim 15 wherein said optical information recording medium has a dielectric film, a record film, another dielectric film, and reflection film formed in this order on a substrate, the thickness of said reflection film being between 5 nm and 70 nm.

19. The optical information read/write device of claim 18 wherein the thickness of said reflection film is not less than 10 nm.

20. The optical information read/write device as claimed in claim 13 wherein the irradiation light intensity for erasing the information written on each guide groove is differentiated from that for erasing the information written on each land by said optical beam intensity control means.

21. An optical information read/write device comprising
(a) an optical system irradiating an optical information recording medium with an optical beam emitted from a light source said optical information medium having record tracks defined by guide grooves formed concentrically on a substrate and lands each defined inbetween two guide grooves adjacent with each other and a record film formed on record tracks which undergoes a local change in the reflectance with irradiation of an optical beam,
(b) first means for moving said optical beam along the direction normal to tracks,
(c) second means for relatively moving said optical beam along the direction of the tracks,
(d) means for detecting the lateral deviations of said optical beam from the information track by measuring the reflected beam from or transmitted beam through said optical information recording medium and putting out signals associated with said deviations referred to as first signals, (e) means for receiving said first signals, inverting the polarity of said first signals so that the polarity when said optical beam is on guide grooves is opposite to the polarity when said optical beam is on regions between two guide grooves adjacent with each other, and putting out the modified signals referred to as second error signals, and (f) tracking control means for receiving said second error signals and controlling said optical beam moving means so that said optical beam correctly traces the information tracks, (g) means for writing information signals of series of pulses on said information tracks with irradiation of said optical beam having a light intensity enough for causing said local change to form record marks corresponding to pluse durations of said informations, (h) means for reading said information with irradiation of said optical beam having a light intensity not causing said local change, and (i) optical beam intensity control means for controlling the irradiation light intensity of said optical beam upon writing said information signal so that the irradiation light intensity for each pulse space of said information signal is different from that for each duration of said information signal, whereby said information signal is written on each guide groove and land with irradiation light intensities different from each other, respectively.

22. The optical information read/write device as claimed in claim 20, wherein the depth of said guide grooves in optical length being between approximately $\lambda/7$ and $\lambda/5.2$, where $\lambda$ is the wavelength of a read optical beam, the width of said guide groove and the width of said region between the two adjacent guide grooves being approximately equal to each other, having a relationship given as follows:

$$0.34 \leq W_g/R \leq 1.0,$$

where R represents the beam diameter of said laser beam on said record film as defined as the diameter where the intensity reduces to $1/e^2$ of the intensity of the center of said laser beam, and where $W_g$ is said width of said guide grooves.

23. The optical information read/write device of claim 21 wherein said record film of said optical information recording medium is made of a phase-change type material that undergoes phase change between an amorphous phase and a crystalline phase.

24. The optical information read/write device of claim 23 wherein said optical information recording medium has a dielectric film, a record film, and another dielectric film formed in this order on a substrate, the thickness of said record film being between 5 nm and 50 nm.

25. The optical information read/write device of claim 23 wherein said optical information recording medium has a dielectric film, a record film another dielectric film, and reflection film formed in this order on a substrate, the thickness of said reflection film being not less than 10 nm.

26. The optical information read/write device of claim 23 wherein said optical information recording medium has a dielectric film, a record film, another dielectric film, and reflection film formed in this order on a substrate, the thickness of said reflection film being between 5 nm and 70 nm.

27. The optical information read/write device of claim 26 wherein the thickness of said reflection film is not less than 10 nm.

28. The optical information read/write device as claimed in claim 13 wherein the irradiation light intensity for erasing the information written on each guide groove is differentiated from that for erasing the information written on each land by said optical beam intensity control means.

* * * * *

UNITED STATES PATENT AND TRADEMARK OFFICE
CERTIFICATE OF CORRECTION

PATENT NO. : 5,448,551
DATED : September 5, 1994
INVENTOR(S) : Naoyasu MIYAGAWA et al.

It is certified that error appears in the above-indentified patent and that said Letters Patent is hereby corrected as shown below:

Title Page:

Col. 1, Line 11, insert

--[73] Assignee: Matsushita Electric Industrial Co., Ltd.--

Signed and Sealed this

Ninth Day of January, 1996

Attest:

BRUCE LEHMAN

Attesting Officer     Commissioner of Patents and Trademarks